US010839227B2

(12) United States Patent
Mongeon et al.

(10) Patent No.: US 10,839,227 B2
(45) Date of Patent: Nov. 17, 2020

(54) QUEUE GROUP LEADER IDENTIFICATION (71) Applicant: Conduent Business Services, LLC, Dallas, TX (US)

(72) Inventors: Michael C. Mongeon, Walworth, NY (US); Matthew Adam Shreve, Tampa, FL (US); Robert P. Loce, Webster, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 904 days.

(21) Appl. No.: 13/933,194

(22) Filed: Jul. 2, 2013

(65) Prior Publication Data
US 2014/0063256 A1 Mar. 6, 2014

Related U.S. Application Data (60) Provisional application No. 61/694,650, filed on Aug. 29, 2012.

(51) Int. Cl.
*H04N 7/18* (2006.01)
*G06K 9/00* (2006.01)
*G06T 7/215* (2017.01)
*G06Q 20/30* (2012.01)

(52) U.S. Cl.
CPC ..... *G06K 9/00771* (2013.01); *G06K 9/00335* (2013.01); *G06Q 20/30* (2013.01); *G06T 7/215* (2017.01); *H04N 7/18* (2013.01); *H04N 7/181* (2013.01); *G06T 2207/20112* (2013.01); *G06T 2207/30232* (2013.01)

(58) Field of Classification Search
CPC .. H04N 7/18; G06K 9/00335; G06K 9/00771; G06K 9/00785; G06Q 20/30
USPC .......................................................... 348/150
See application file for complete search history.

(56) References Cited

U.S. PATENT DOCUMENTS

| 5,097,328 | A | 3/1992 | Boyette |
| 5,138,638 | A | 8/1992 | Frey |
| 5,465,115 | A | 11/1995 | Conrad et al. |
| 5,581,625 | A | 12/1996 | Connell |
| 5,953,055 | A | 9/1999 | Huang et al. |
| 6,195,121 | B1 | 2/2001 | Huang et al. |
| 6,654,047 | B2 | 11/2003 | Iizaka |

(Continued)

OTHER PUBLICATIONS

"Detection and tracking of shopping groups in stores"—Haritaoglu, I.; Flickner, M.; Proceedings of the 2001 IEEE Computer Society Conference on Computer Vision and Pattern Recognition, 2001, vol. 1, p. 1-431-1-438, DOI: 10.1109/CVPR.200E990507. (Year: 2001).*

(Continued)

*Primary Examiner* — Mainul Hasan
(74) *Attorney, Agent, or Firm* — Fay Sharpe LLP (57) ABSTRACT A system and method to identify the leader of a group in a retail, restaurant, or queue-type setting (or virtually any setting) through recognition of payment gestures. The method comprises acquiring initial video of a group, developing feature models for members of the group, acquiring video at a payment location, identifying a payment gesture in the acquired video, defining the person making the gesture as the leader of the group, and forwarding/backtracking through the video to identify timings associated with leader events (e.g., entering, exiting, ordering, etc.).

19 Claims, 8 Drawing Sheets

(56) References Cited

U.S. PATENT DOCUMENTS

| | | |
|---|---|---|
| 6,967,674 B1 | 11/2005 | Lausch |
| 7,688,349 B2 * | 3/2010 | Flickner ............. G06K 9/00778 |
| | | 348/150 |
| 7,909,248 B1 | 3/2011 | Goncalves |
| 7,957,565 B1 | 6/2011 | Sharma et al. |
| 8,009,863 B1 | 8/2011 | Sharma et al. |
| 8,010,402 B1 * | 8/2011 | Sharma ................. G06Q 10/00 |
| | | 705/7.29 |
| 8,170,909 B2 | 5/2012 | Brown et al. |
| 8,224,028 B1 * | 7/2012 | Golan ................ G06K 9/00778 |
| | | 382/103 |
| 8,253,831 B2 * | 8/2012 | Bobbitt ............. G06K 9/00342 |
| | | 348/274 |
| 8,478,048 B2 | 7/2013 | Ding et al. |
| 8,515,813 B2 | 8/2013 | Van Buskirk et al. |
| 8,700,392 B1 | 4/2014 | Hart et al. |
| 2002/0194137 A1 | 12/2002 | Park et al. |
| 2007/0253595 A1 * | 11/2007 | Sorensen ................. G07C 9/00 |
| | | 382/103 |
| 2009/0217315 A1 * | 8/2009 | Malik .................... H04N 7/181 |
| | | 725/9 |
| 2009/0249342 A1 | 10/2009 | Johnson |
| 2011/0246329 A1 | 10/2011 | Geisner et al. |
| 2011/0251954 A1 | 10/2011 | Chin |
| 2012/0207350 A1 * | 8/2012 | Loos .................. G06K 9/00778 |
| | | 382/103 |
| 2012/0254032 A1 | 10/2012 | Carbonell |
| 2013/0024267 A1 * | 1/2013 | Libenson ............... G06Q 30/02 |
| | | 705/14.38 |
| 2013/0066749 A1 | 3/2013 | Cooke et al. |
| 2013/0218721 A1 | 8/2013 | Borhan et al. |

OTHER PUBLICATIONS

I. Laptev, M. Marszalek, C. Schmid, B. Rozenfeld, "Learning realistic human actions from movies", Computer Society Conference on Computer Vision and Pattern Recognition (CVPR 2008), Jun. 24-26, 2008, Anchorage, Alaska, USA, 8 pgs.

C. Schuldt, I. Laptev, B. Caputo. "Recognizing Human Actions: A Local SVM Approach", 17th International Conference on Pattern Recognition (ICPR '04), Aug. 23-26, 2004, Cambridge, UK., 5 pgs.

H. Wang, M. Ullah, M. Muhammad, A. Klaser, I. Laptev, C. Schmid. "Evaluation of local spatio-temporal features for action recognition", Paper, US Copyright 2009, 11 pgs.

H. Wang, M. Ullah, M. Muhammad, A. Klaser, I. Laptev, C. Schmid. "Evaluation of local spatio-temporal features for action recognition". Presentation at 20th British Machine Vision Conference (BMVC) London, England, Sep. 7-10, 2009, 33 pgs.

* cited by examiner

QUEUE GROUP LEADER IDENTIFICATION

INCORPORATION BY REFERENCE

This application claims priority to and the benefit of the filing date of U.S. Ser. No. 13/964,652, filed Aug. 12, 2013, which application claims priority to and the benefit of the filing date of U.S. Provisional Patent Application Ser. No. 61/694,650, filed Aug. 29, 2012, which applications are incorporated by reference in their entirety.

BACKGROUND

Advances and increased availability of surveillance technology over the past few decades have made it increasingly common to capture and store video footage of retail settings for the protection of companies, as well as for the security and protection of employees and customers. This data has also been of interest to retail markets for its potential for data-mining and estimating consumer behavior and experience. For some large companies, slight improvements in efficiency or customer experience can have a large financial impact.

Several efforts have been made at developing retail-setting applications for surveillance video beyond well-known security and safety applications. For example, one such application counts detected people and records the count according to the direction of movement of the people. In other applications, vision equipment is used to monitor queues, and/or groups of people within queues. Still other applications attempt to monitor various behaviors within a reception setting.

One industry that is particularly heavily data-driven is fast food restaurants. Accordingly, fast food companies and/or other restaurant businesses tend to have a strong interest in numerous customer and/or store qualities and metrics that affect customer experience, such as dining area cleanliness, table usage, queue lengths, experience time in-store and drive-through, specific order timing, order accuracy, and customer response.

BRIEF DESCRIPTION

The present disclosure recognizes that timings and general monitoring of a customer space can be better understood and compared if there is a reference feature or person of the group. This is addressed by identifying the leader of a group through recognition and association of a payment gesture or gestures.

The present disclosure sets forth a method to identify the leader of a group in a retail, restaurant, or queue-type setting (or virtually any setting) through recognition of payment gestures. In one exemplary embodiment, the method comprises acquiring initial video of a group, developing feature models for members of the group, acquiring video at a payment location, identifying a payment gesture in the acquired video, defining the person making the gesture as the leader of the group, and forwarding/backtracking through the video to identify timings associated with leader events (e.g., entering, exiting, ordering, etc.).

While the timing of leader events is useful, aspects of the present disclosure are also directed to identifying other analytics associated with the leader (e.g., are they picking up the food, first leave/enter, where they stand, etc.).

Accordingly, an aspect of the present disclosure is directed to a method of monitoring a customer space comprising obtaining visual data including image frames of the customer space over a period of time, generating feature models for members of at least one group within the customer space, identifying a payment gesture in at least one image frame, associating the payment gesture with a member of the at least one group based at least in part on the feature models, and designating a leader of the group as the member associated with the payment gesture.

The method can further comprise, after designating the leader, analyzing the visual data to determine the timing or occurrence of at least one event involving the leader. The at least one event can include one or more of the leader entering the customer space, the leader exiting the customer space, or the leader placing an order. The method can further comprise, after designating the leader, analyzing the visual data before and after the payment gesture to identify at least one characteristic of the leader's experience within the retail space. The at least one characteristic can include position within the group, location within the retail space, or action taken by the leader. The generating feature models can include using a face detection algorithm. The obtaining visual data can include obtaining overhead visual data comprising image frames of a payment location, and using said overhead visual data to identify the payment gesture. The associating the payment gesture with a member of the at least one group based at least in part on the feature models can include determining the member making the payment gesture based on location information associated with the visual data. The obtaining visual data can include recording images with a camera.

In accordance with another aspect, a non-transitory computer-readable medium having stored thereon computer-executable instructions for monitoring a customer space is set forth, the instructions being executable by a processor and comprising obtaining visual data comprising image frames of the customer space over a period of time, generating feature models for members of at least one group within the customer space, identifying a payment gesture in at least one image frame, associating the payment gesture with a member of the at least one group based at least in part on the feature models, and designating a leader of the group as the member associated with the payment gesture.

The instructions can further comprise, after designating the leader, analyzing the visual data to determine the timing or occurrence of at least one event involving the leader. The at least one event can include one or more of the leader entering the customer space, the leader exiting the customer space, or the leader placing an order. The instructions can further comprise, after designating the leader, analyzing the visual data before and after the payment gesture to identify at least one characteristic of the leader's experience within the retail space. The at least one characteristic can include, position within the group, location within the retail space, or action taken by the leader.

In accordance with another aspect, a system for monitoring a customer space comprises at least one optical sensor for obtaining visual data corresponding to the customer space, and a central processing unit including a processor and a non-transitory computer-readable medium having stored thereon computer-executable instructions for monitoring a customer space executable by the processor, the instructions comprising receiving visual data of the customer space over a period of time from the optical sensor, generating feature models for members of at least one group within the customer space, identifying a payment gesture in at least one image frame, associating the payment gesture with a member of the at least one group based at least in part on the feature models, and designating a leader of the group as the member associated with the payment gesture.

The system can further comprise a plurality of optical sensors including at least one overhead sensor associated with a payment location, said overhead sensor adapted to obtain visual data relating to a payment gesture, and at least one oblique sensor adapted to obtain visual data for generating the feature models from a direction other than overhead. The instructions can further comprise, after designating the leader, analyzing the visual data to determine the timing of at least one event involving the leader. The at least one event includes one or more of the leader entering the customer space, the leader exiting the customer space, or the leader placing an order. The instructions can further comprise, after designating the leader, analyzing the visual data before and after the payment gesture to identify at least one characteristic of the leader's experience within the retail space. The at least one characteristic can include, position within the group, location within the retail space, or action taken by the leader.

DETAILED DESCRIPTION

Figure 1:
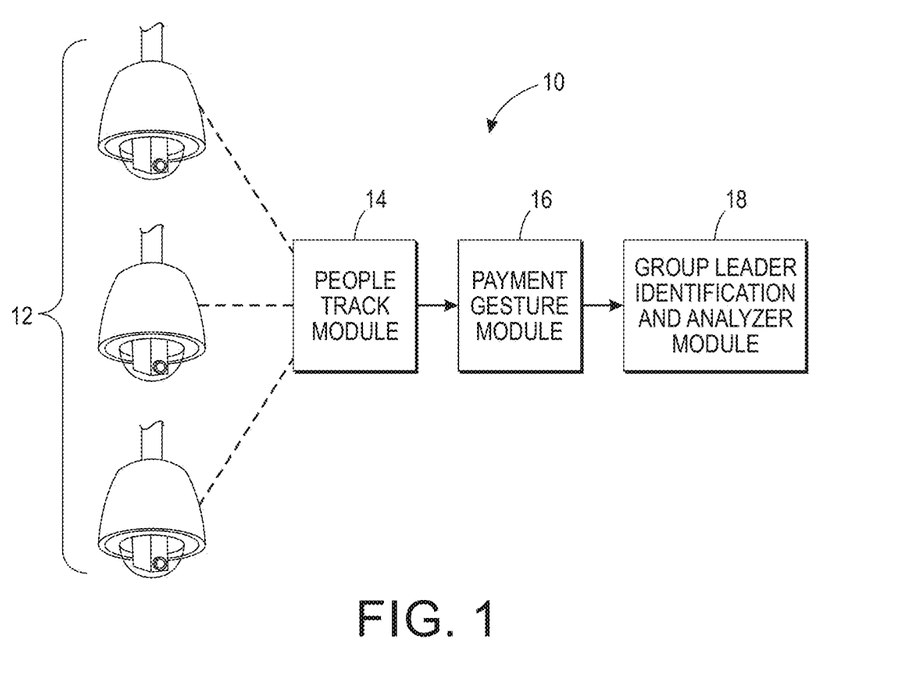
FIG. 1 is a block diagram of an exemplary system in accordance with the present disclosure.

With reference to FIG. 1, a system 10 in accordance with the present disclosure comprises a plurality of modules, illustrated schematically in FIG. 1. The system 10 includes a video capture module 12 that acquires visual data (e.g., video frames or image frames) of customer space, such as a retail establishment, restaurant, etc. The video capture module is illustrated as a plurality of cameras, which may be surveillance cameras or the like. A people track module 14 receives the visual data from the cameras and both identifies individuals within the customer space and tracks the identified individuals as they move within the space. For example, a family may enter the customer space and walk to a counter to place a food order (or any other type of transaction), then proceed to a dining table or other location to dine (or other location to await service). A payment gesture module 16 identifies an individual making a payment gesture such as swiping a credit card, handing over cash, etc. A group leader identification and analyzer module 18 utilizes information from both the people track module 14 and the payment gesture module 16 to identify a leader of a group of individuals in the customer space based upon the individual within the group making the payment gesture. Module 18 then analyzes the visual data to determine the timing of events relative to the group leader such as the length of time the group leader is in the customer space before the payment gesture, the amount of time the group leader remains in the customer space after a payment gesture, etc. Other details can be ascertained such as the order in which the group entered the customer space relative to the group leader, whether the group leader remains in the customer space after the payment gesture or departs the customer space leaving at least some of the members of the group in the customer space. All of this information can be used to enhance customer experience by better understanding how customers move and interact within the customer space.

In an exemplary embodiment, the video capture module 12 can comprise at least one surveillance camera that captures video of an area including the ROI. No special requirements in terms of spatial or temporal resolutions are needed for most applications. Traditional surveillance cameras are typically IP cameras with pixel resolutions of VGA (640×480) and above and frame rates of 15 fps and above. Such cameras are generally well-suited for this application. Higher resolution cameras can also be utilized, as well as cameras having other capabilities such as IR and thermal imaging cameras, for example.

Figure 2:
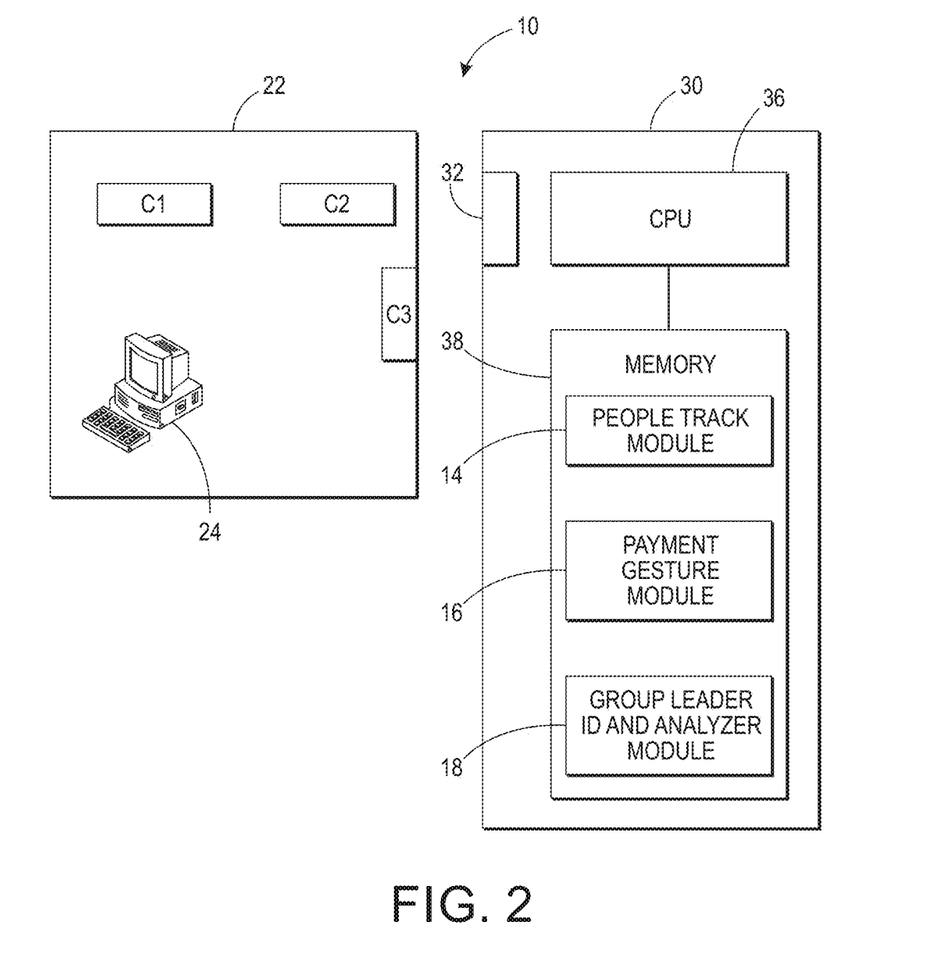
FIG. 2 is a block diagram of another exemplary system in accordance with the present disclosure.

In FIG. 2, the exemplary system 10 is illustrated in block diagram form in connection with a customer space 22. It will be appreciated that video capture module 12 is shown as a plurality of cameras C1, C2 and C3. At least one of cameras C1 or C2 is an overhead camera adapted to view a payment station, such as the region about a cash register 24 or card reader, from overhead to detect payment gestures. An exemplary method and device for detecting payment gestures is set forth in U.S. Provisional Application Ser. No. 61/694,650, filed Aug. 29, 2012, which is hereby incorporated herein by reference in its entirety.

The cameras C1, C2 and C3 are connected to a computer 30 and supply visual data comprising one or more image frames thereto via a communication interface 32. It will be appreciated that the computer 30 can be a standalone unit configured specifically to perform the tasks associated with the aspects of this disclosure. In other embodiments, aspects of the disclosure can be integrated into existing systems, computers, etc. The communication interface 32 can be a wireless or wired communication interface depending on the application. The computer 30 further includes a central processing unit 36 coupled with a memory 38. Stored in the memory 38 are the people track module 14, the payment gesture module 16, and the group identification and analyzer module 18. Visual data received from the cameras C1, C2 and C3 can be stored in memory 38 for processing by the CPU 36 in accordance with this disclosure.

Figure 3:
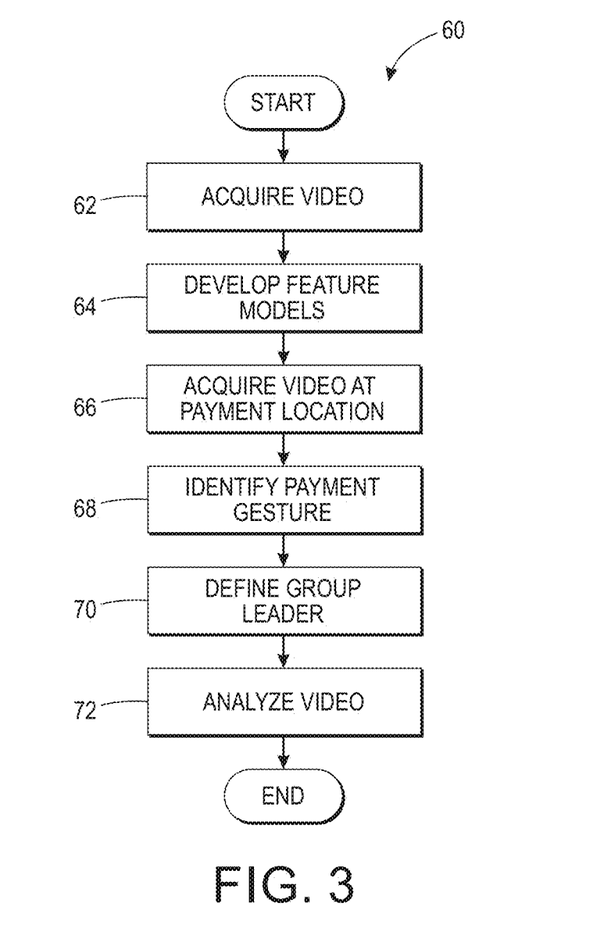
FIG. 3 is a flowchart of an exemplary method in accordance with the present disclosure.

Turning to FIG. 3, a flowchart illustrates an exemplary method 60 in accordance with the present disclosure. The basic method 60 comprises acquiring initial video of a group in step 62, developing feature models for the members of the group in step 64, acquiring video at a payment location in step 66, identifying a payment gesture in the acquired video in step 68, defining the person making the payment gesture as the leader of the group in step 70, and analyzing the video to determine one or more events relative to the group leader in step 72. The method 60 will now be described in detail in conjunction with the remaining figures that illustrate an exemplary implementation of the method.

Figure 4:
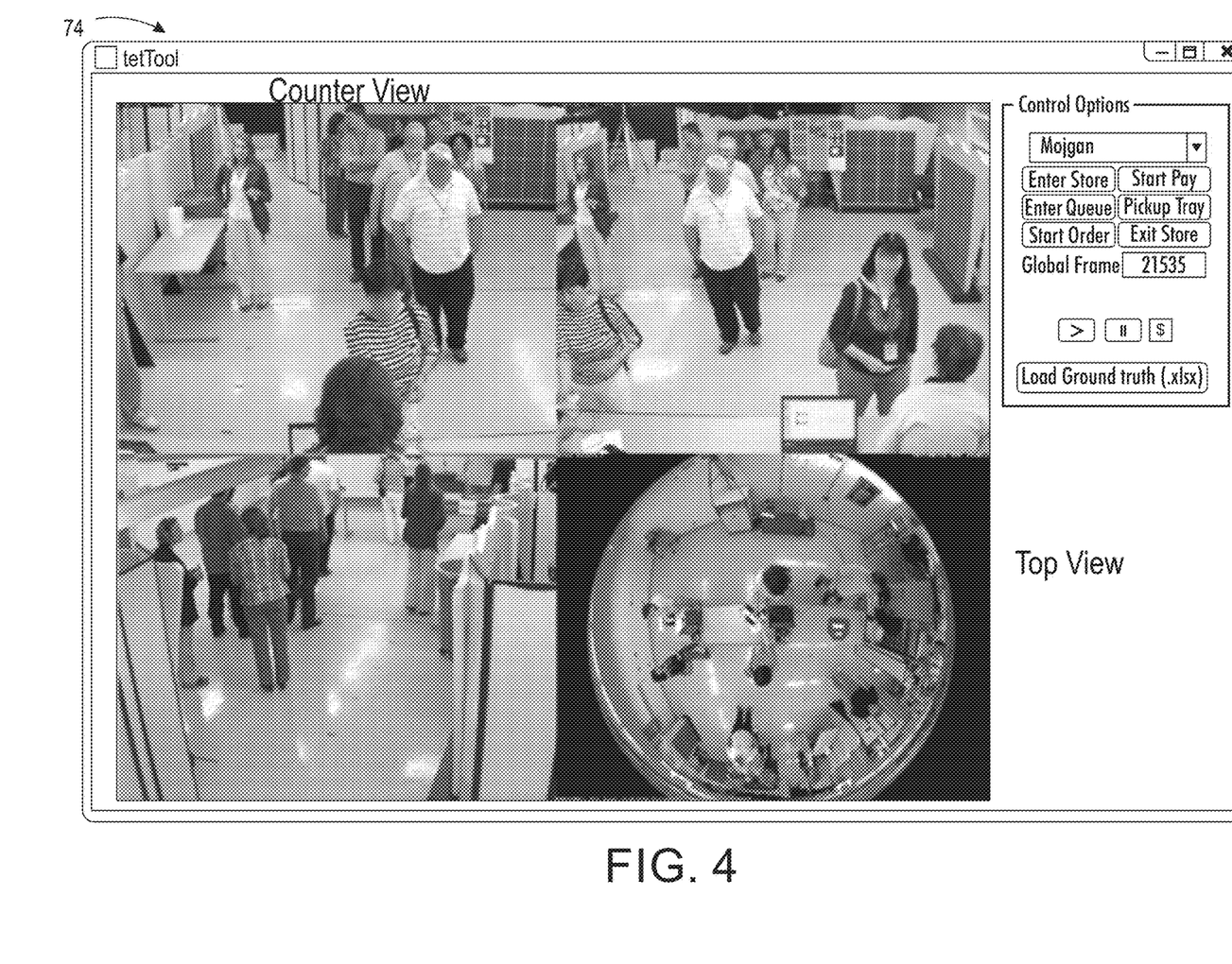
FIG. 4 is a screenshot of an exemplary program implementing certain aspects of the present disclosure.

With reference to FIG. 4, as a group visits a store or other customer space, they are captured on video from several cameras at various locations. FIG. 4 illustrates a screenshot 74 from an exemplary software program implementing aspects of the present disclosure. The exemplary embodiment includes cameras located behind a cashier (e.g., counter view, upper left and upper right frames) to enable face detection, and cameras located in front of the cashier (lower left frame) and above the cashier counter (e.g., top view, lower right frame) for payment gesture detection. The top two images of FIG. 4 show the counter view and can be used primarily to develop the database, while the lower right image shows a top view useful for detecting payment gestures. The top two frames and lower right frames are from cameras having oblique views other than overhead. In one embodiment, the cameras acquire video at a given frame rate (e.g., 30 fps), and compress it to H.264 format.

After a group enters a store they may join other groups in a queue that are waiting to order. At the order point, each group member may place their order individually or by the group leader. The group leader will pay the cashier in the form of cash, credit, debit, or other payment method. The group will pick up their order and continue their experience.

During the payment transaction, video of the group leader is acquired from the "top view" via the overhead camera. It will be appreciated that acquiring video is an ongoing process that occurs continually throughout a groups visit to the store and is then utilized once a group leader is detected to examine the groups experience within the customer space.

Figure 5:
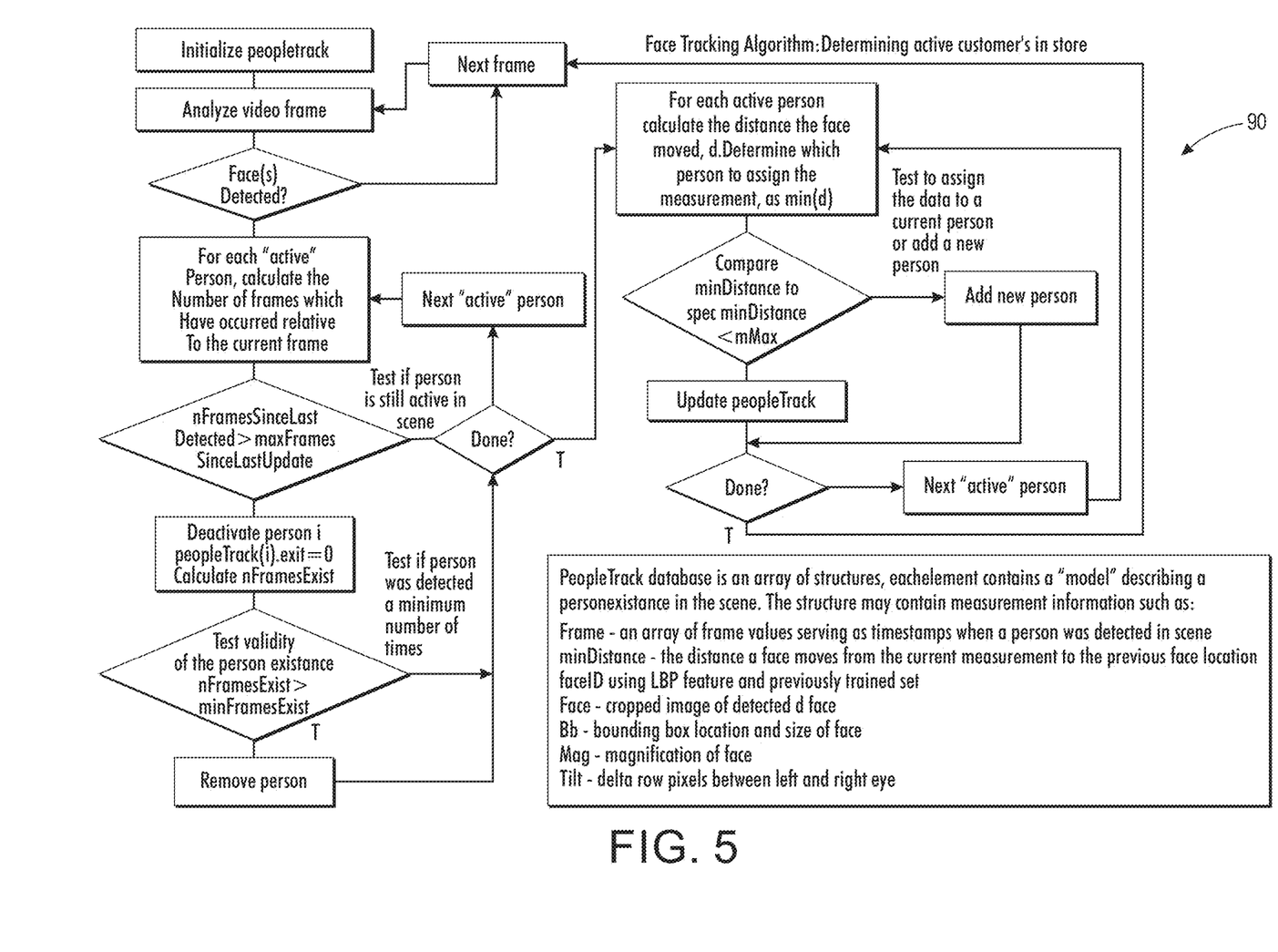
FIG. 5 is a flowchart depicting an exemplary face tracking algorithm in accordance with the present disclosure.

From the "counter view" camera, a face detection algorithm is applied to each frame. From these results, a database is constructed comprising individual people in the store using, for example, the algorithm 90 illustrated in FIG. 5. An array of structures comprising the database "peopleTrack" is initialized. For a given element or person i=1, 2, . . . , nPeople, the structure can contain the following data:

peopleTrack(i).frame—an array of frame values serving as timestamps when a person was detected in scene peopleTrack(i).minDistance—the distance a face moves from the current measurement to the previous face location peopleTrack(i).active—boolean value indicates whether a person is still in the scene A video frame is analyzed using a face detection algorithm.

For each face that is detected, calculate "nFramesSinceLastDetected", the number of frames which have passed since the last detection.

If
nFramesSinceLastDetected>maxFramesSinceLastUpdate, then the person is deactivated, else continue with the next detected face.

If a person was deactivated, test to determine if the person existed long enough:

nFramesExist<minFramesExist.

If the person did not exist at least minFramesExist, then remove the person from peopleTrack.

For the peopleTrack database, determine the "active" people in the scene, iActive.

For each face detected, calculate the distance from each "active" person as follows:

$$d(iActive)=\text{sqrt}((x(iActive)-xMeas)^2+(y(iActive)-yMeas)^2)$$

Determine which active person to assign the measurement, minDistance=min(d(iActive)) found at index iMatch.
Compare to maximum allowed displacement, mMax.
minDistance<mMax If true, then update peopleTrack for person iMatch with current measurement values.

If false, add a new person to the peopleTrack database, and initialize with current measurement values.

Next, video is acquired at a payment location using the "top view" shown in FIG. 4. In an exemplary configuration, a fisheye camera is utilized so the entire counter is captured with a single camera. Initial testing with this configuration finds it difficult to detect gestures at registers far from the center of view due to large spatial correction errors, and hidden transaction areas blocked by the cash register. These issues can be addressed by using several conventional cameras, rather than a single fisheye, associated with one or more payment locations.

Once video of the payment location is acquired, a payment gesture in the acquired video is identified, and the person making the gesture is defined as the leader of the group. An exemplary method 90 for performing this is shown as a flow chart in FIG. 6.

Figure 6:
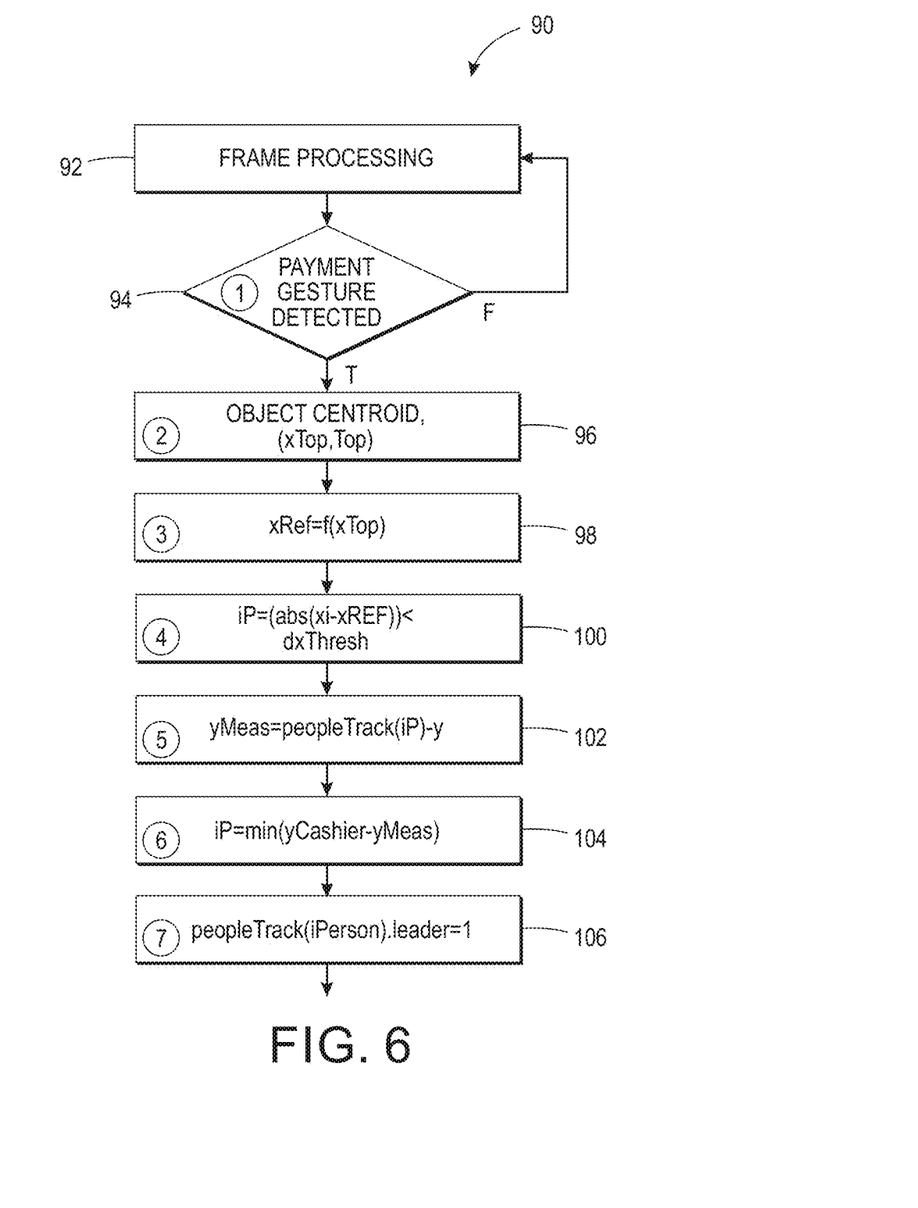
FIG. 6 is a flowchart of an exemplary method in accordance with the present disclosure.

Beginning with step 92, frame processing of the overhead camera image frames is ongoing. As the group leader makes a payment gesture, such as cash handoff or credit swipe, it is automatically detected with the top view camera in step 94 using methods described in commonly assigned U.S. Provisional Patent Application No. 61/694,650, filed Aug. 29, 2012.

Figure 7:
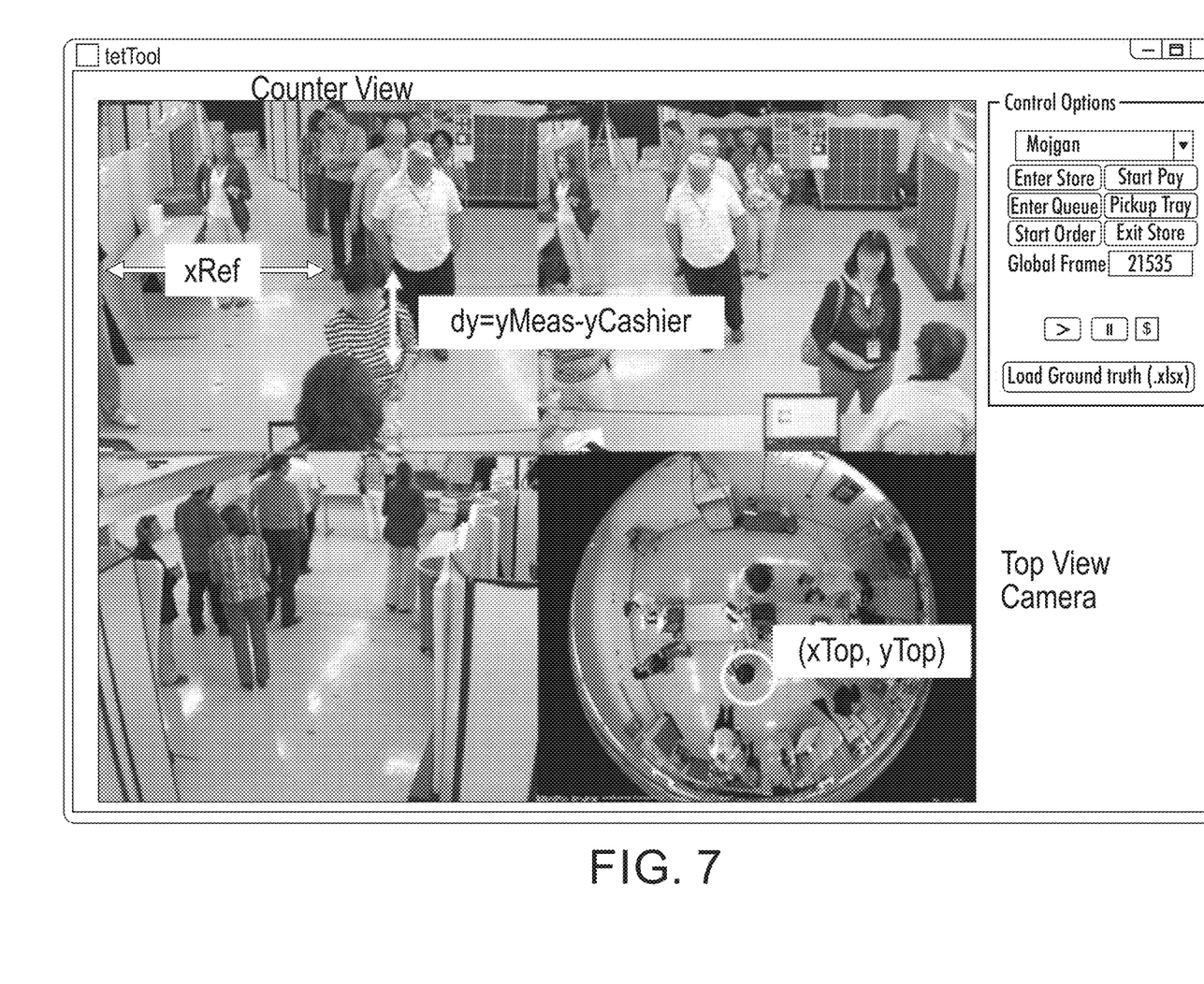
FIG. 7 is the screenshot of FIG. 4 with annotation marks added thereto.

During the transaction, the group leader (e.g., person making paying gesture) is segmented using a defined region of interest, background subtraction, morphological operations, and connected component analysis, resulting in a centroid measurement (xTop, yTop) in step 96. This is shown in the lower right image of FIG. 7. It will be appreciated that FIG. 7 is identical to FIG. 4 but with reference markers overlaid thereon.

Figure 8:
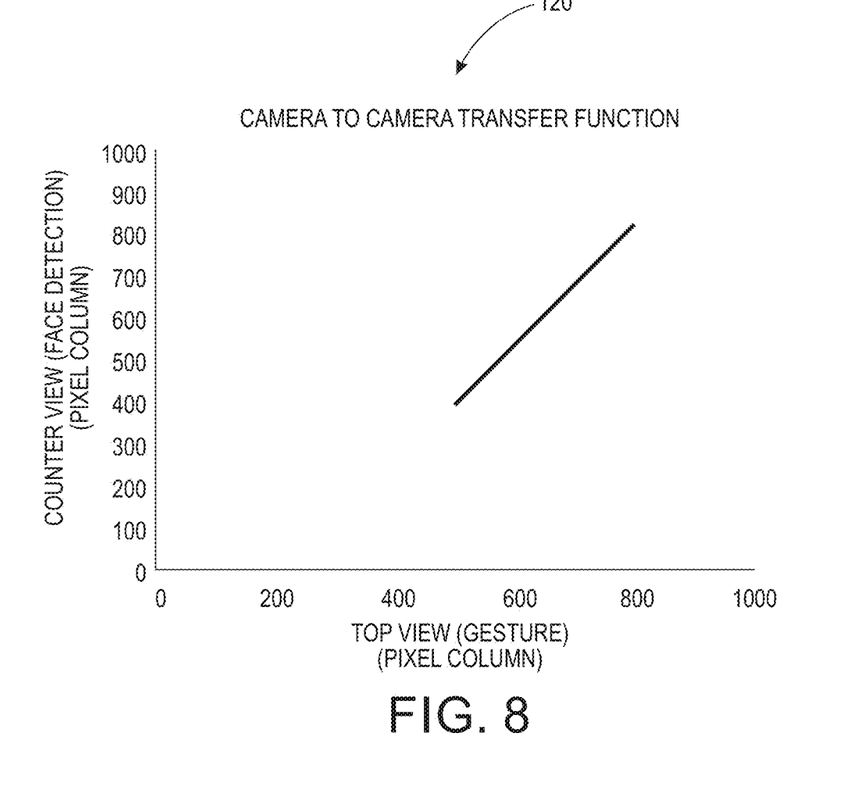
FIG. 8 is a graph of a camera-to-camera transfer function in accordance with the present disclosure.

Next, the corresponding lateral position in the "counter view" camera is determined in step 98. During camera setup, a linear transfer function is developed which relates an object lateral position with multiple camera views, a graph 120 of such function is shown in FIG. 8. For example:

$$xRef=c\text{Offset}+MR \times xTop$$

where:
cOffset is the camera to camera mounting position offset
MR is the camera to camera magnification ratio
The transfer function converts object position from the top view camera to frontal face position detected by the counter camera.

Next, in step 100, using the feature model the current "active" people in the store that are close to xRef are determined. iP=min(abs(xi−xRef)<dxThresh, where iP is an index value of potential group leaders and dxThresh is the lateral position estimation tolerance.

In step 102, the pixel row locations for each candidate group leader are determined as follows:

$$yMeas=\text{peopleTrack}(iP).y$$

Then, in step 104, which candidate is closest to the cashier is determined by: [dy,iLeader]=min(yCashier−yMeas)

Where:
dy is the distance in pixels between the group leader and the cashier
iLeader is the index value of the group leader In step 106, iPerson is associated as the group leader by peopleTrack(iLeader).leader=1

Once the group leader is identified, the visual data can be mined to identify timings associated with leader events (e.g., entering, exiting, ordering). In addition, once the leader has been identified, tracking techniques can be used to monitor this person forward and backward in time to establish event times, such as entering, ordering, paying, exiting. Other analytics associated with the leader can also be examined including:
  Are they picking up the food or other goods
  First leave/enter
  Where they stand
  Size of the group
  Constituents in the group (adults, children)
  Gender or other identifiers of interest
  Expressions It will be appreciated that the leader can be associated with the group using one or more factors, such as similar entrance times, verbal interactions, similar trajectories, etc.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of monitoring a customer space comprising:
   obtaining a video stream from an overhead camera capturing video from at least one region of interest, the region of interest associated with a type of payment gesture;
   detecting motion within the at least one region of interest;
   creating a representation of the motion occurring within the at least one region of interest;
   detecting the payment gesture based on the representation;
   obtaining visual data comprising image frames from a counter view camera;
   generating feature models for members of at least one group within the customer space using the image frames from the counter view camera;
   associating the payment gesture with a member of the at least one group; and
   designating a leader of the group as the member associated with the payment gesture;
   wherein the payment gesture includes tender of payment at a payment station within the customer space; and
   wherein the payment gesture includes at least one of swiping a credit card or presenting cash at a payment station within the customer space.

2. The method of claim 1 further comprising, after designating the leader, analyzing the visual data to determine the timing of at least one event involving the leader.

3. The method of claim 2, wherein the at least one event includes one or more of the leader entering the customer space, the leader exiting the customer space, or the leader placing an order.

4. The method of claim 1 further comprising, after designating the leader, analyzing the visual data before or after the payment gesture to identify at least one characteristic of the leader's experience within the retail space.

5. The method of claim 4, wherein the at least one characteristic includes position within the group, location within the retail space, or action taken by the leader.

6. The method of claim 1, wherein the generating feature models includes using a face detection algorithm.

7. The method of claim 1, wherein the obtaining visual data includes obtaining overhead visual data comprising image frames of a payment station, and using said overhead visual data to identify the payment gesture including at least one of swiping a credit card or presenting cash.

8. The method of claim 7, wherein the associating the payment gesture with a member of the at least one group includes determining the member making the payment gesture based on location information associated with the visual data.

9. The method of claim 1, wherein the obtaining visual data includes recording images with an overhead camera, and wherein the designating a leader of the group as the member associated with the payment gesture is based solely on the payment gesture as identified in the images.

10. A non-transitory computer-readable medium having stored thereon computer-executable instructions for monitoring a customer space, the instructions being executable by a processor and comprising:
    obtaining a video stream from an overhead camera capturing video from at least one region of interest, the region of interest associated with a type of payment gesture;
    detecting motion within the at least one region of interest;
    creating a representation of the motion occurring within the at least one region of interest;
    detecting the payment gesture based on the representation;
    obtaining visual data comprising image frames from a counter view camera;
    generating feature models for members of at least one group within the customer space using the image frames from the counter view camera;
    associating the payment gesture with a member of the at least one group; and
    designating a leader of the group as the member associated with the payment gesture;
    wherein the payment gesture includes at least one of swiping a credit card or presenting cash at a payment station within the customer space; and
    wherein the camera is an overhead camera.

11. The non-transitory computer-readable medium as set forth in claim 10, wherein the instructions further comprise, after designating the leader, analyzing the visual data to determine the timing of at least one event involving the leader.

12. The non-transitory computer-readable medium as set forth in claim 10, wherein the at least one event includes one or more of the leader entering the customer space, the leader exiting the customer space, or the leader placing an order.

13. The non-transitory computer-readable medium as set forth in claim 10, wherein the instructions further comprise, after designating the leader, analyzing the visual data before or after the payment gesture to identify at least one characteristic of the leader's experience within the retail space.

14. The non-transitory computer-readable medium as set forth in claim 13, wherein the at least one characteristic includes, position within the group, location within the retail space, or action taken by the leader.

15. A system for monitoring a customer space comprising:
    at least one overhead optical sensor for obtaining a video stream capturing video from at least one region of interest, the region of interest associated with a type of payment gesture; and
    a central processing unit including a processor and a non-transitory computer-readable medium having stored thereon computer-executable instructions for monitoring a customer space executable by the processor, the instructions comprising:
       receiving visual data of the region of interest over a period of time from the overhead optical sensor;
       detecting motion within the at least one region of interest;

creating a representation of the motion occurring within the at least one region of interest;

detecting the payment gesture based on the representation;

obtaining visual data from at least one oblique sensor;

generating feature models for members of at least one group within the customer space using the visual data from the oblique sensor;

associating the payment gesture with a member of the at least one group; and designating a leader of the group as the member associated with the payment gesture;

wherein the payment gesture includes at least one of swiping a credit card or presenting cash at a payment station within the customer space.

16. The system of claim 15, wherein the instructions further comprise, after designating the leader, analyzing the visual data to determine the timing of at least one event involving the leader.

17. The system of claim 16, wherein the at least one event includes one or more of the leader entering the customer space, the leader exiting the customer space, or the leader placing an order.

18. The system of claim 15, wherein the instructions further comprise, after designating the leader, analyzing the visual data before and after the payment gesture to identify at least one characteristic of the leader's experience within the retail space.

19. The system of claim 18, wherein the at least one characteristic includes, position within the group, location within the retail space, or action taken by the leader.

* * * * *